(12) United States Patent
Allor

(10) Patent No.: US 6,784,883 B1
(45) Date of Patent: Aug. 31, 2004

(54) DYNAMIC TREE-NODE PROPERTY PAGE EXTENSIONS

(75) Inventor: Jason M. Allor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 09/894,702

(22) Filed: Jun. 28, 2001

(51) Int. Cl.[7] ................................................ G06T 15/00
(52) U.S. Cl. ...................................................... 345/419
(58) Field of Search ................................ 707/102–104, 707/104.1; 717/124; 345/419, 440

(56) References Cited

U.S. PATENT DOCUMENTS 6,167,404 A * 12/2000 Morcos et al. .............. 707/102

OTHER PUBLICATIONS

Gavron et al., "How to Use Windows NT 4 Workstation", 1996, Ziff Davis Press, Chapter 4.*
Terveen, L., et al., "Constructing, organizing, and visualizing collections of topically related Web resources", ACM Transactions on Computer–Human Interaction, vol. 6, No. 1, Mar. 1999, p. 67–94.

* cited by examiner

Primary Examiner—Mark Zimmerman
Assistant Examiner—Lance W. Sealey
(74) Attorney, Agent, or Firm—Amin & Turocy, LLP

(57) ABSTRACT

Several systems and associated methodologies are provided for adding one or more property pages to one or more types of data. The property pages are added to a data type based upon a unique identifier associated with the data type. The property pages can be selectively enableable property pages which can be selectively enabled for a particular item for a type of data. In accordance with user input, a property page control can display appropriate property pages to a user via a display.

12 Claims, 10 Drawing Sheets

US 6,784,883 B1

DYNAMIC TREE-NODE PROPERTY PAGE EXTENSIONS

TECHNICAL FIELD

The present invention relates to the field of systems and/or methodologies that deal with organizing data. More particularly, the present invention pertains to systems and/or methodologies that enable pages of data to be added to one or more types of data and then be displayed.

BACKGROUND OF THE INVENTION

It is known to organize or arrange data in some fashion so that the data is manageable. For example, large amounts of data may be broken down into different types of data. The different types of data can be displayed on a computer system in a tree structure where nodes on the tree correspond to different types of data. Each type of data may include sub-data corresponding to properties of the data type. The sub-data can be referred to as property pages associated with the data type.

By way of illustration, consider that a computer program may be put through a series of tests as the program is developed. For instance, a computer program may be put through one type of test known as a Manual Test and another test known as an Automated Test as the program is being developed. Each of these different tests can be considered a type of data that would be a node within a data tree structure. Because the data types correspond to types of tests, the tree structure may be referred to as a testing tree. The particular computer program being tested can be considered the particular item for which the tests are run. Accordingly, if only one computer program (item) is tested there may be one Manual Test node and one Automated test node on the testing tree. If two programs are tested there may be two Manual Test nodes and two Automated Test nodes on the testing tree (e.g. one for each of the two programs tested). If three programs are tested there may be three Manual Test nodes and three Automated Test nodes on the testing tree (e.g. one for each of the three programs tested). Additionally, a computer program may be put through the same test any suitable number of times. For instance, one particular computer program may be put through a Manual Test four times, which could result in four separate Manual test nodes for that particular program (item). As the number of items increases, the size of the testing tree increases. The size of the testing tree also increases as the number of data types increases. For instance, if a third type of test, known as a Blind Test, exists and three computer programs were put through all three tests, there may be a total of nine nodes on the testing tree (e.g. three Manual Test nodes, three Automated Test nodes and three Blind Test nodes, one for each of the three programs tested). It is to be appreciated, however, that in organizing data not all items necessarily go with all types of data. This can affect the number of nodes within a data tree structure. For instance, each of the computer programs may not necessarily be put through all of the tests (e.g. one of the computer programs may only be put through Manual and Automated Tests, but not the Blind Test). This would alter the number of nodes on the testing tree as a Blind Test node would not exist for this particular computer, program.

Generally sub-data exists that corresponds to and/or describes properties of data types. For instance, sub-data can exist for Manual, Automated and Blind Tests. Because this sub-data corresponds to and/or describes properties of these types of data, chunks of this sub-data can be referred to as property pages for the data types. When data is organized on a computer, these property pages may be displayed to a user so that the user can see some of the organized information. With regard to computer program testing, these property pages may include, for example, data corresponding to how long a test will run, what resources a test will require, who designed a test, how long a test has been running, what percentage of a test has been processed, intermediate test results, how long a test ran, graphs of test results, etc.

Because types of data usually have some general similarities as well as some general differences, some property pages may be applicable to most data types, while other property pages may only be suitable for select data types. For instance, if every type of test (e.g. Manual, Automated, Blind) was designed by the same entity, then the same property pages pertaining to information about this entity may exist for each of these types of tests. Each of these same property pages can, therefore, be displayable on a computer for each of these different types of tests. On the other hand, if the Manual and Automated Tests have some characteristic which is different from a characteristic of the Blind Test, then the Manual and Automated Test can have similar property pages corresponding to this characteristic, while the Blind Test can have different property pages corresponding to its different characteristic. For example, the Manual and Automated Tests can have operating metrics which are different from the operating metrics of the Blind Test. In this instance, the same property pages referring to operating metrics can be associated with the Manual and Automated Tests, while different property pages referring to different operating metrics can be associated with the Blind Test. Furthermore, one or more types of data can include one or more property pages that simply do not apply to another type of data. For instance, one type of data (e.g. Manual Test) can have property pages corresponding to sub-data (e.g. a security protocol) that does not have any application to another type of data (e.g. Automated Test that does not include a security protocol).

It is to be appreciated that particular items can also affect the applicability of property pages. For instance, a particular computer program (item) may have one or more unique characteristics which give rise to property pages which are unique to this particular computer program. As such, these property pages would only be associated with the nodes corresponding to the type of tests that this program was put through. For instance, if this test was run through Manual and Automated Tests, but not a Blind Test, then these unique property pages would only be displayable for the Manual and Automated Test nodes for this particular computer program, but not for the Blind Test and not for any other data types (e.g. Manual, Automated, Blind Tests) that correspond to different computer programs which are tested.

It can be appreciated that as more and more computer programs (items) are developed and are put through different tests during their respective developmental processes, the growth of a testing tree can increase dramatically (e.g. as the number of test nodes increases in proportion to the number of programs that are tested). For example, a very large testing tree with thousands of nodes may easily come into existence. Accordingly, as the number of programs (items) that are tested increases, the difficulty of adding one or more property pages to a type of data (e.g. Manual Test) increases because the number of nodes of that type of data increases. The process can be even more daunting when the one or more property pages are to be added to all types of for each of the items being tested (e.g. all of the tests for each computer program being tested). The process can also be tedious if one or more property pages are to be added to only one type of data for one particular item of interest (e.g. are only to be added to the Manual Test for one particular computer program being tested). This is because all of the nodes of that data type (e.g. Manual Test) may need to be searched through to find the particular item of interest (e.g. the particular computer program that is being put through a Manual Test).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention mitigates the foregoing shortcomings. In particular, the present invention provides for systems and/or methodologies which mitigate difficulties associated with associating one or more property pages with one or more types of data. Additionally, the present invention provides for systems and/or methodologies which address difficulties associated with associating one or more selectively enableable property pages with a type of data (e.g. Manual Test) for a particular item of interest (e.g. the particular computer program being tested). The present invention also allows the pages to be displayed to a user in response to user input.

According to one aspect of the present invention, a property page plug-in can be utilized to insert or add one or more property pages to one or more types of data. The plug-in utilizes unique identifiers associated with the types of data to designate which types of data the one or more pages are to be inserted into.

According to another aspect of the present invention, a plug-in can also be utilized to add one or more selectively enableable property pages to one or more types of data. Again, the plug-in utilizes unique identifiers associated with the types of data to determine which types of data the one or more selectively enableable pages are to be inserted into.

According to another aspect of the present invention, each of the selectively enableable property pages also have unique identifiers associated with them. These unique identifiers are utilized to determine whether a selectively enableable property page has in fact been enabled for a particular item within a data type.

According to yet another aspect of the present invention, a folder exists for each type of data and all of the property pages for each type of data are stored within these folders. The identifiers for each type of data are also associated with these folders so that the property pages can be added to these folders.

According to still another aspect of the present invention, a control is disclosed that, in response to user input, is adapted to pull property pages from the folders and present them on a display.

To the accomplishment of the foregoing and related ends, certain illustrative aspects of the invention are described herein in connection with the following description and the annexed drawings. These aspects are indicative, however, of but a few of the various ways in which the principles of the invention may be employed, and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
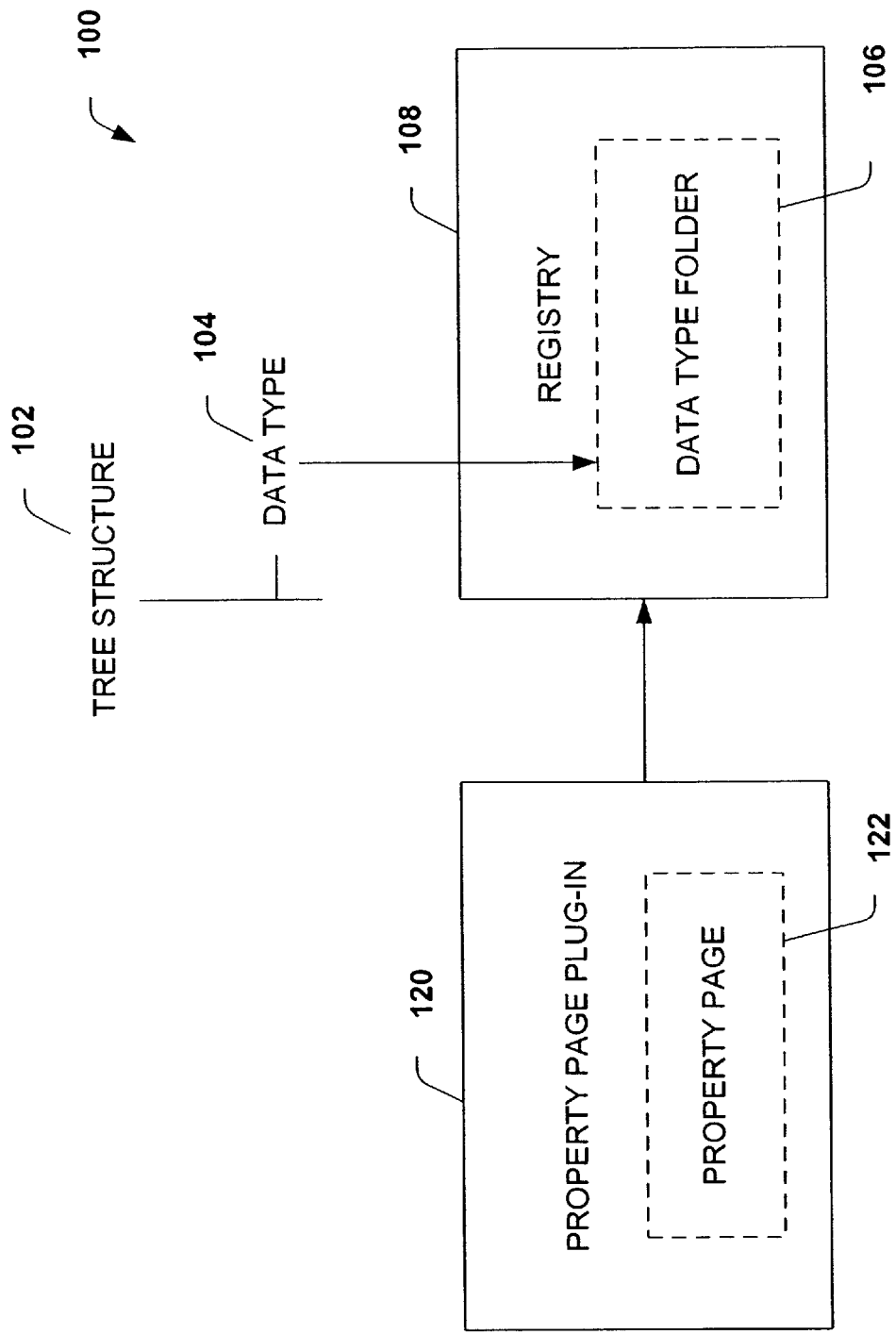
FIG. 1 is a schematic block diagram illustrating a system adapted to add property pages to data types in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

The present invention provides for systems and/or methodologies that mitigate difficulties related to associating one or more property pages with one or more types of data. Additionally, the present invention provides for systems and/or methodologies that mitigate difficulties related to associating one or more selectively enableable property pages with one or more types of data (e.g. Manual Test) for a particular item of interest (e.g. the particular computer program being tested by a Manual Test). The present invention also provides for a control that allows a user to selectively view one or more property pages.

With reference to FIG. 1, in accordance with one aspect of the present invention, a system 100 is shown that facilitates adding a property page to a type of data. A property page includes data relevant to a property of a data type. Property pages are generally displayable to a user in response to user input. For purposes of illustration, a data tree structure 102 is shown in FIG. 1. The tree structure 102 is illustrated as having a data type node 104. Referring back to the computer program testing example described in the background, the tree structure 102 could be a testing tree and the data type node 104 could correspond to a type of test (e.g. Manual Test). The data type node 104 is shown pointing to a data type folder 106 located in a registry 108. This illustrates that a registry can be employed to maintain property pages. The registry can be a shared system for an operating system. The registry can contain information about entities including, but not limited to, a system's hardware, software, configuration and users. Some programs can add information to the registry and read information back from the registry.

For purposes of simplicity and ease of understanding, the property pages for a data type are illustrated herein as being maintained within the registry 108 and more specifically within a type folder 106 within the registry. However, one skilled in the art can appreciate that the property pages themselves may not actually be stored within the registry. Instead, links to the property pages and/or the actual location of the property pages as well as other information about the pages can be stored within the type folder 106 within the registry 108. Instead of the registry, the property pages themselves can actually be stored somewhere else on the computer system (e.g. hard drive). In this instance, the property pages may, for example, be COM based plug-ins that are loadable in response to user input. More particularly, the property pages can be loaded in response to user input which indicates user's desire to see the information contained within the property pages.

With continuing reference to FIG. 1, to enable a property page 122 to be added to a data type 104, the present invention contemplates a property page plug-in 120. The plug-in can be a computer program that can be installed on a computer system to cause some processing module to take some action. The plug-in can also be a hardware and/or software component operable to add functionality to another system. For example, a plug-in can be an executable that is employed with a browser to extend the functionality of the browser. In the browser context, the job of a plug-in can be to process a particular type of data that the browser cannot process. But plug-ins are not restricted to the browser context. A plug-in can similarly be employed to extend the capabilities of other programs. For example, a displaying program may be capable of displaying data. If additional data becomes available to be displayed, the displaying program may not be capable of displaying such additional data. Thus, a plug-in may be written that can be employed to extend the capabilities of the displaying program to facilitate displaying the additional data. The ability to extend the functionality of a program leads to plug-ins sometimes being referred to as "helper applications". Plug-ins can be downloaded from a plug-in server on the Internet. Such download may occur on an "as-needed" basis. For example, a displaying program may function for a period of time, and during that period of time may encounter data that the displaying program is operable to display. But then the displaying program may encounter data that it is not operable to display. Thus, the displaying program may then "need" a plug-in so that it can display such data. If such a plug-in is located and successfully downloaded off of the Internet, the functionality of the displaying program may be extended and the previously un-displayable data may be displayed.

In the example illustrated in FIG. 1, the plug-in 120 is adapted to hold a property page 122 that is to be added to the data type 104. The plug-in 120 may be operable to add the page 122 into the data type folder 106 in the registry 108. The plug-in 120 can add the property page 122 to the datatype folder 106 in the registry 108 as soon as it is installed on the computer. In general, the property page 122 is added to the registry 108 only once, during setup. As will be discussed in further detail below, globally unique identifiers (GUIDs) can be utilized to identify a data type and assist with associating a property page with a type folder in the registry.

Figure 2:
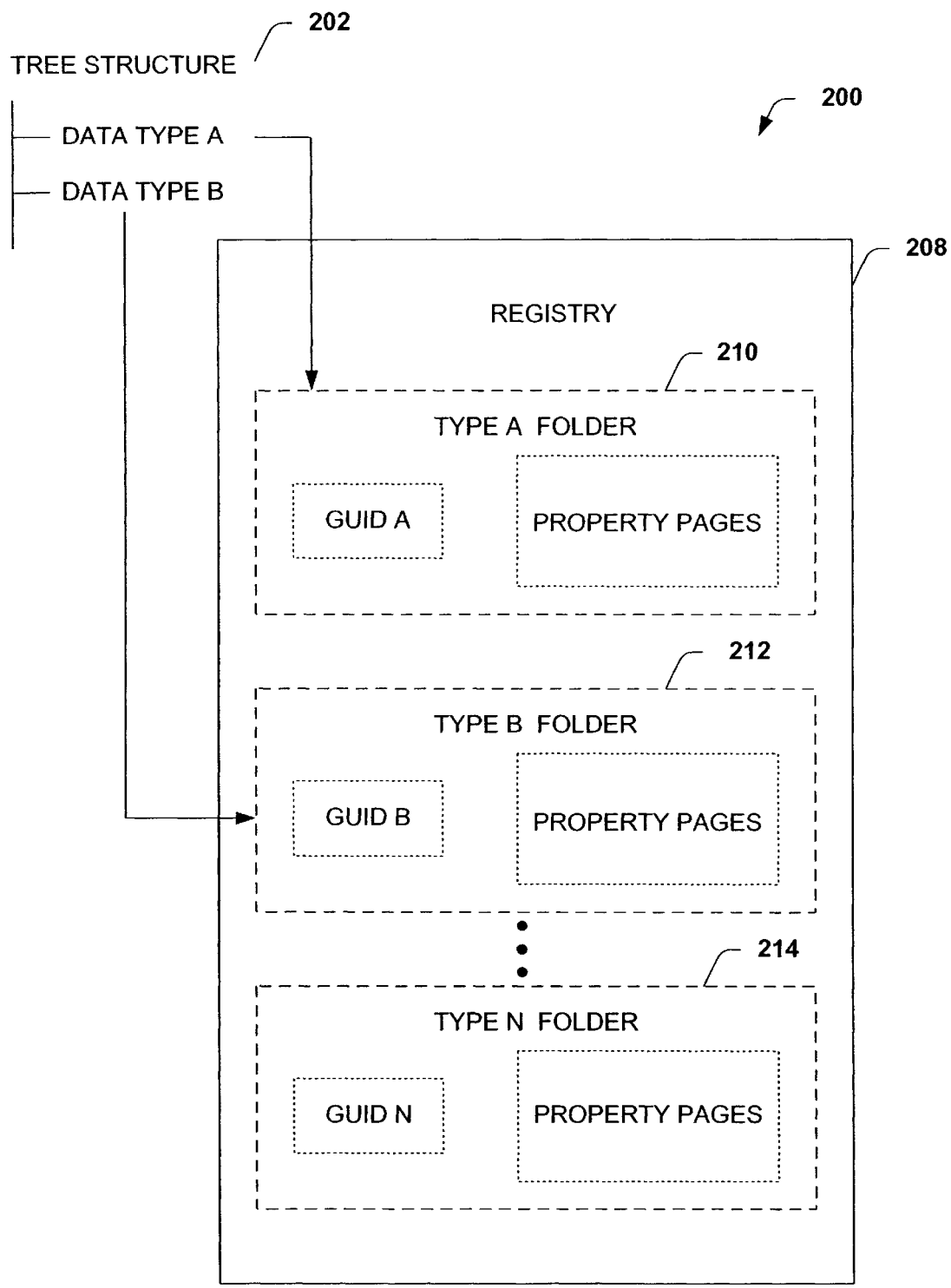
FIG. 2 is an illustration of a registry containing data type folders adapted to contain property pages in accordance with an aspect of the present invention.

With reference now to FIG. 2, because there is usually more than one type of data that can be organized into a tree structure, the present invention contemplates more than one data type folder that can be located within a registry 208. For instance, a tree structure 202 is illustrated as having two nodes, namely data type A and data type B. Referring back to the computer program example, the tree structure 202 could be a testing tree and the data type A node could correspond to a Manual Test and the data type B node could correspond to an Automated Test. It is to be appreciated that, if additional computer programs are developed and tested by the Manual and Automated Tests, additional Manual Test nodes and additional Automated Test nodes would be added to the tree 202 for the additional computer programs tested.

The type A and type B nodes illustrated in FIG. 2, point to a type A folder 210 and a type B folder 212, respectively, located within the registry 208. Property pages corresponding to sub-data associated with type A data are stored within the type A folder 210 in registry 208 and property pages corresponding to sub-data associated with type B data are stored in the type B folder 212 in the registry 208.

It is to be appreciated that where there is more than one item for type A data and more than one item for type B data, substantially all of the type A data is stored in the type A folder 210 and substantially all of the type B data is stored in the type B folder 212. For instance, if more than one computer program (item) is tested and there are property pages for the Manual Tests run on the different computer programs these Manual Test property pages are stored in the Manual Test folder (e.g., type A folder 210). Similarly, where more than one computer program (item) is tested and there are property pages for the Automated Tests run on the different computer programs, the Automated Test property pages are stored in the Automated Test folder (e.g., type B folder 212).

Although two data types are illustrated in FIG. 2, it is to be appreciated that a greater or lesser number of data types may be accounted for in accordance with the present invention. Stated another way, the present invention anticipates other than two data types (e.g., Manual and Automated Tests). Accordingly, the folders shown in FIG. 2 are illustrated as including type A folder 210, type B folder 212 through type N folder 214, where N is an integer. This is meant to illustrate that any suitable number of type folders can be adapted to exist within the registry to hold any suitable number of property pages for any suitable number of different data types. As will be discussed in further detail below, the present invention contemplates that any suitable number of property pages can be added to any suitable number of data type folders. As will be explained, this can be accomplished, for example, by way of a property page plug-in. After being added to several different type folders, a property page can then appear in each of these data types.

It is also to be appreciated that, while reference is made herein to the aforementioned testing example, the testing example is merely intended to illustrate one of a number of contexts with which the present invention can be discussed. The example is referenced herein for the purposes of simplicity and ease of understanding only and is in no way intended to limit the scope of the present invention. The example is merely meant to be illustrative of types of data and items having some relationship thereto such that the invention can be discussed with regard to a context.

By way of illustration, the present invention can also be discussed with regard to data concerning motor vehicles. Data concerning motor vehicles could, for example, be broken down into types of data corresponding to vehicle manufacturers (e.g., manufacturer A, manufacturer B, manufacturer C). Similarly, data concerning motor vehicles could be broken into types of data corresponding to vehicle types (e.g., sedans, sport utility vehicles, mini-vans). The data types could be organized into tree structures wherein the data types are represented by nodes within the tree structures. For instance, the types of vehicle manufacturers (e.g., manufacturer A, manufacturer B, manufacturer C) could be represented by nodes within a vehicle manufacturer tree structure.

The data types can include sub-data corresponding to properties of the data types. Different chunks of this sub-data can, therefore, be referred to as property pages. When the motor vehicle data is organized on a computer, these property pages can be displayed to a user. Some of these property pages may be associated with one or more data types while other pages may be unique to one data type. For example, with regard to the data type of vehicle manufacturers (e.g., manufacturer A, manufacturer B, manufacturer C), property pages including, but not limited to, financing, safety, general specifications, and cost may be displayable for each of the data types, while other property pages are displayable for only some of the data types. For instance, if only one data type (e.g., manufacturer A) used a particular tire (e.g., tire A), a property page relating to those (A) tires may be included and displayable only for that (manufacturer A) data type. Similarly, if the other data types (e.g. manufacturer B and manufacturer C) used only another tire (e.g., tire C), a property page relating to those (C) tires may be included and displayable only for those (manufacturer B and manufacturer C) data types (but not the manufacturer A data type).

With continuing reference to FIG. 2, so that a property page can be selectively added to one or more types of data, one exemplary aspect of the present invention contemplates the use of global user interface identifiers (GUIDs) or unique identifiers to facilitate the selective addition of property pages to one or more data types. GUIDs are numbers that are randomly generated, typically by a computer, that are unique. Once a GUID is generated, it can be associated with an object, such as a type of data, to identify that object For example, a bit map (e.g., 128 bits) generated by a GUID producing algorithm can supply a unique bit map that can be used to uniquely identify an object, such as a type of data, associated with the GUID.

Accordingly, the present invention contemplates associating GUIDs with data types so that data types are identifiable and property pages can then be associated therewith. Consequently, a GUID is associated with each of the type folders located within the registry. More particularly, the data type A folder 210 is associated with a GUID A, while the data type B folder 212 is associated with a GUID B, and so on, down to the data type N folder 214 being associated with a GUID N.

Figure 3:
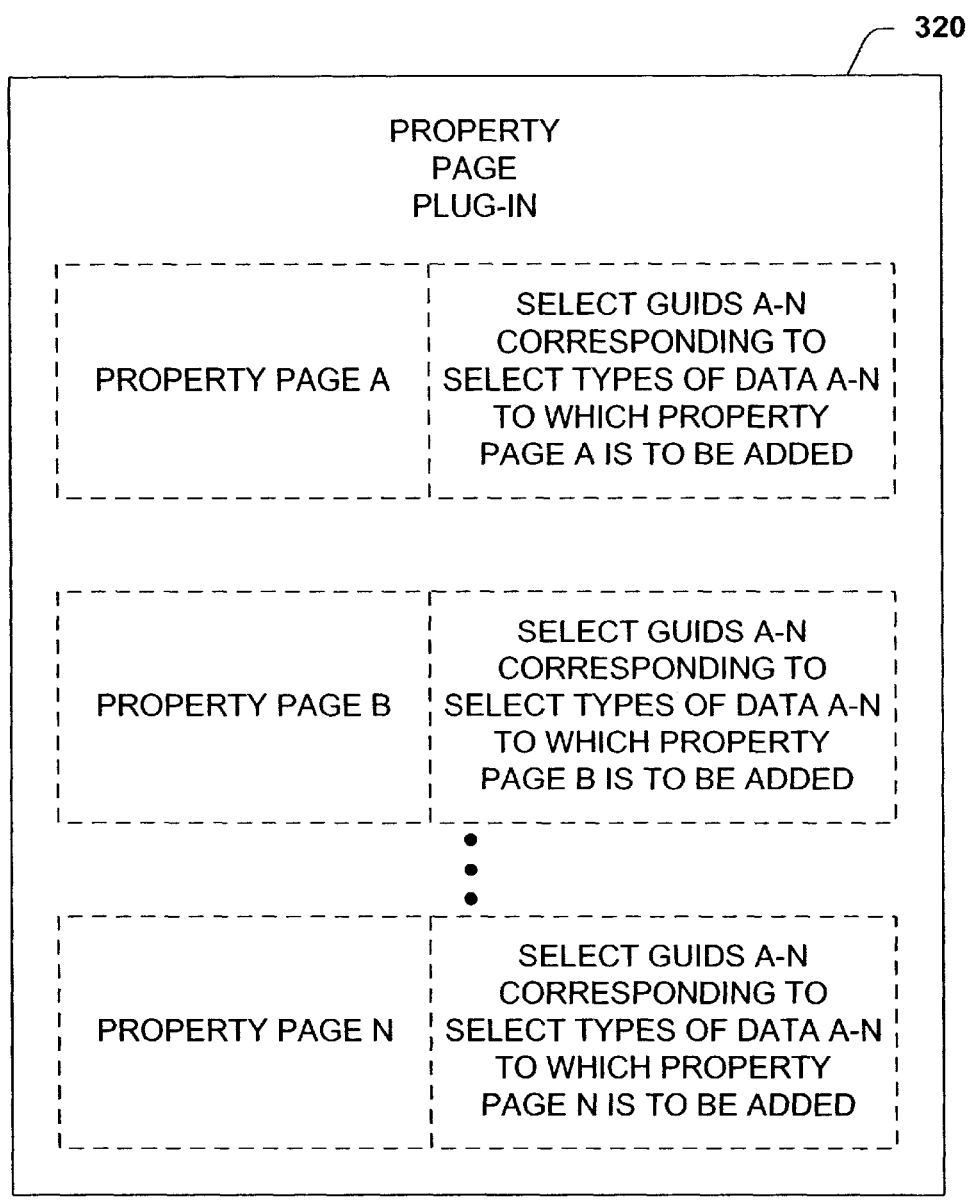
FIG. 3 is an illustration of a property page plug-in that can be used to add property pages to data types in accordance with an aspect of the present invention.

Turning now to FIG. 3, in accordance with an aspect of the present invention, a plug-in 320 is illustrated. The plug-in is adapted to add one or more property pages to one or more data type folders. The plug-in 320 is illustrated in FIG. 3 as being in a state ready to insert one or more property pages into one or more data type folders. More particularly, the plug-in is illustrated as including a property page A and a property page B, down to a property page N, where N is an integer. This is meant to illustrate that the plug-in may be adapted to add any suitable number of property pages to any suitable number of data type folders. The exemplary plug-in 320 shown in FIG. 3 is illustrated as including down to N property pages because it may be desirable to add more than one property page to different data types. Each of these property pages are also illustrated as having GUIDs A–N associated with them, where N is an integer. These GUIDs correspond to the data types to which the respective property pages are to be added. For example, property page A is associated with the select GUIDs A–N. These select GUIDs A–N correspond to the select data types A–N to which property page A is to be added. GUIDs A–N, where N is an integer, are depicted in the example illustrated to illustrate that the property pages can be added to any suitable number of data types.

Figure 4:
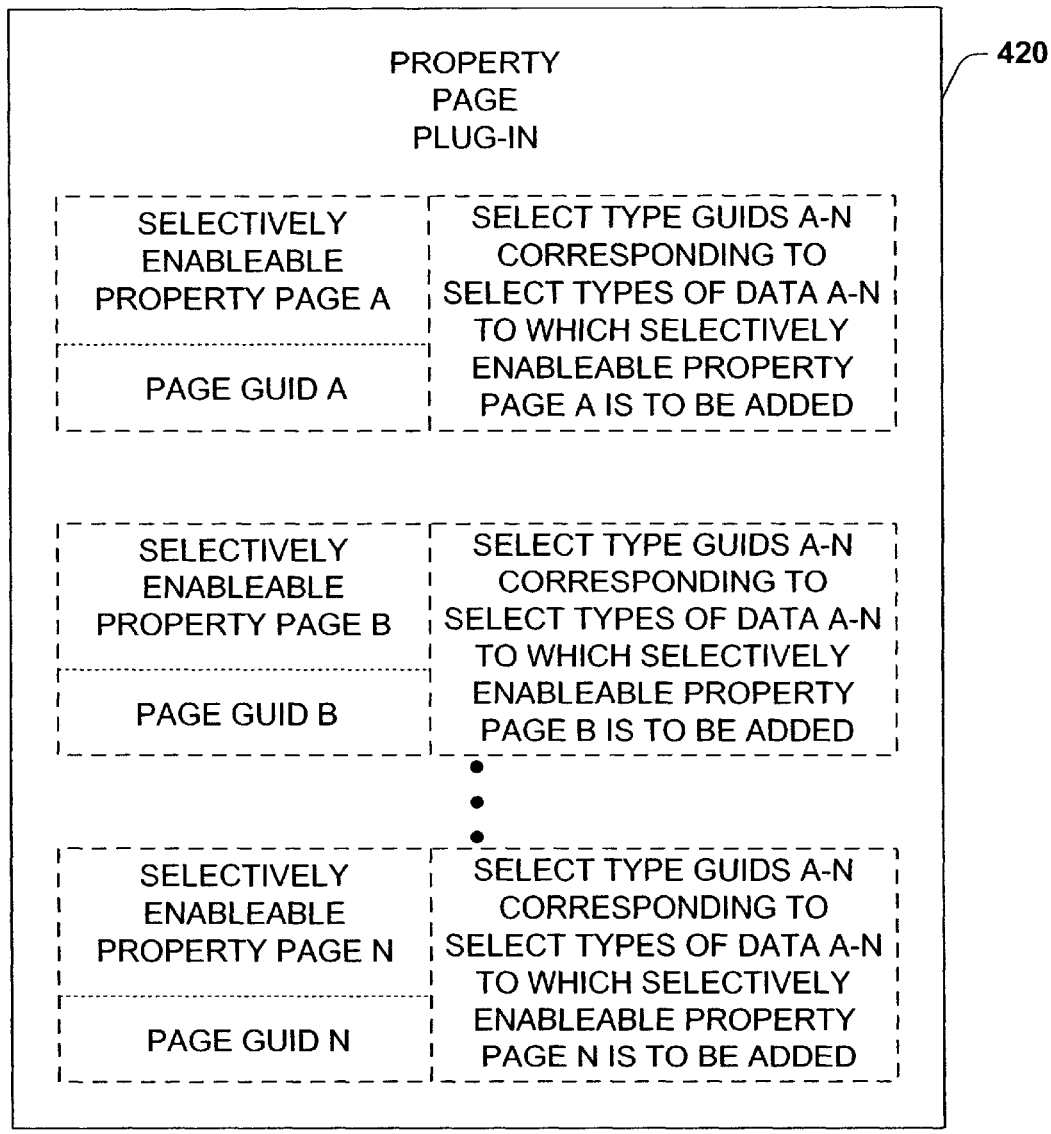
FIG. 4 is an illustration of a property page plug-in that can be used to add selectively enableable property pages to data types in accordance with an aspect of the present invention.

With reference now to FIG. 4, in accordance with another aspect of the present invention, a property page plug-in 420 is illustrated. The plug-in 420 is adapted to add one or more selectively enableable property pages to one or more data type folders. By selectively enableable, it is meant that the property pages can be selectively enabled by a user to be displayed for select data types and particular items of interest. For example, a selectively enableable property page can be selectively enabled by a user to be displayed for a particular computer program that is put through a select test (e.g. a Manual Test).

The plug-in 420 is illustrated in FIG. 4 as being in a state ready to insert one or more selectively enableable property pages into one or more data type folders. More particularly, the plug-in is illustrated as including a selectively enableable property page A and a selectively enableable property page B, down to a selectively enableable property page N, where N is an integer. This is meant to illustrate that the plug-in may be adapted to add any suitable number of selectively enableable property pages to any suitable number of data type folders. The exemplary plug-in 420 shown in FIG. 4 is illustrated as including down to N selectively enableable property pages because it may be desirable to add more than one selectively enableable property page to different data types. Each of these selectively enableable property pages are illustrated as having GUIDs A–N associated with them, N being an integer. These GUIDs correspond to the data types to which the respective selectively enableable property pages are to be added. For example, selectively enableable property page A is associated with the select GUIDs A–N. These select GUIDs A–N correspond to the select data types A–N to which selectively enableable property page A is to be added. GUIDs A–N, where N is an integer, are depicted in the example illustrated to illustrate that the selectively enableable property pages can be added to any suitable number of data types.

The plug-in 420 further includes GUIDs that correspond to the selectively enableable property pages themselves. More particularly, in the example illustrated, each selectively enableable property page has a GUID associated with it. For purposes of clarity and ease of understanding, the GUIDs that are associated with the selectively enableable property pages are at times referred to herein as "page GUIDs" while the GUIDs that are used to identify data types are at times referred to herein as "type GUIDs". Accordingly, the selectively enableable property page A has a page GUID A associated with it, the, selectively enableable property page B has a page GUID B associated with it, on down to the selectively enableable property page N having a page GUID N associated with it, where N is an integer. As will be discussed in more detail below, the page GUIDs are employed to determine whether to display a property page (e.g., whether a selectively enableable property page has been enabled for a particular item for a data type).

Figure 5:
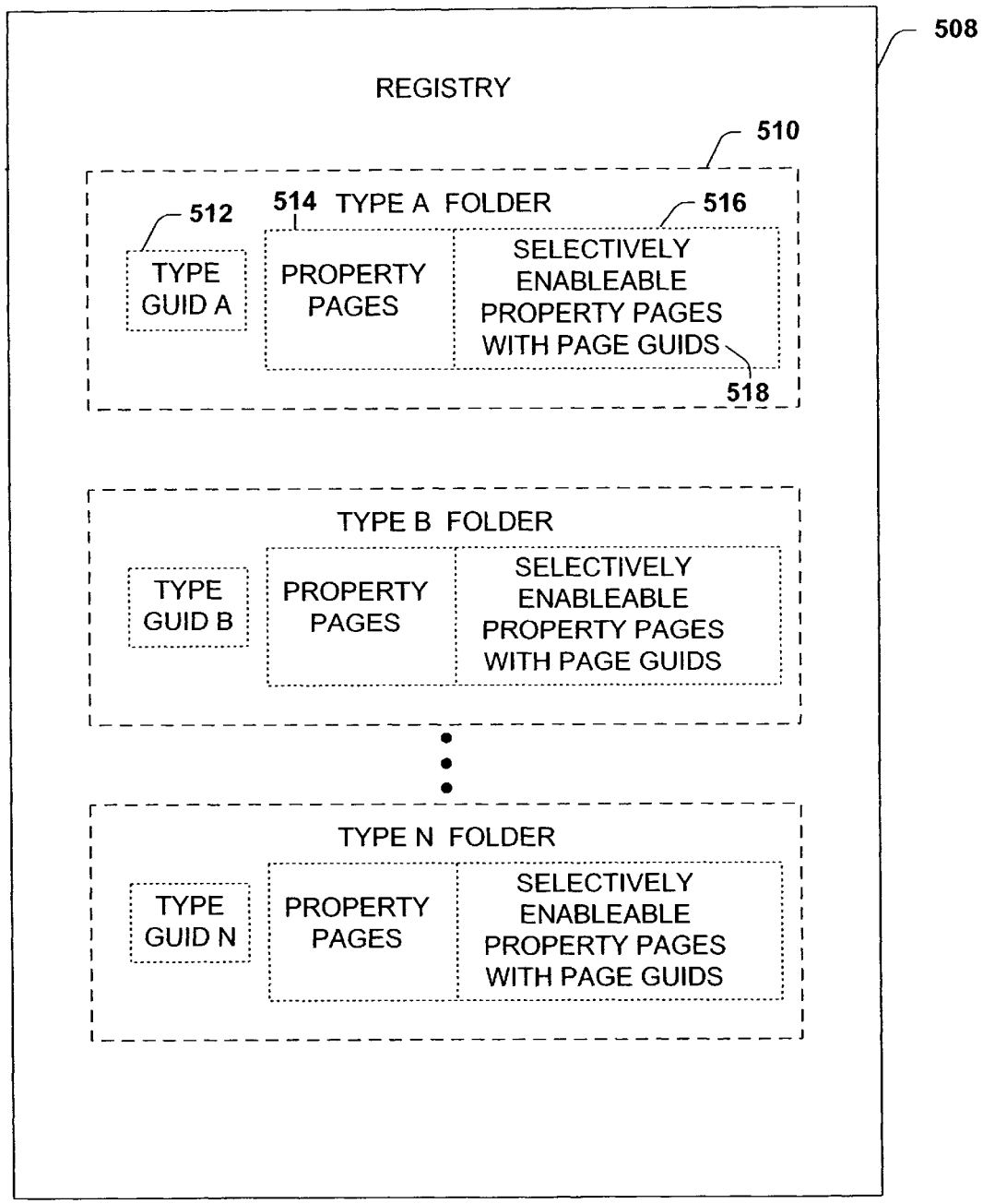
FIG. 5 is an illustration of a registry containing data type folders adapted to contain both regular and selectively enableable property pages in accordance with an aspect of the present invention.

With reference now to FIG. 5, a registry 508 is illustrated. Because the present invention contemplates adding selectively enableable property pages as well as regular (e.g. non-selectively enableable) property pages to data types, in addition to a type GUID which identifies the type of data, each folder in the registry can also generally include the regular property pages for that data type. The page GUIDs associated with the selectively enableable property pages can also generally be included in the type folders. For example, in addition to the type GUID A 512, the type A folder can contain the regular property pages 514 for the data type A as well as the selectively enableable property pages 516 for the type A data and the page GUIDs 518 associated with those selectively enableable property pages 516. As will be discussed in more detail below, the regular property pages contained within a folder for a data type can be displayed for every particular item of that data type while the selectively enableable property pages contained within a folder for a data type can be selectively enabled so that they are displayed for particular items of that data type.

Figure 6:
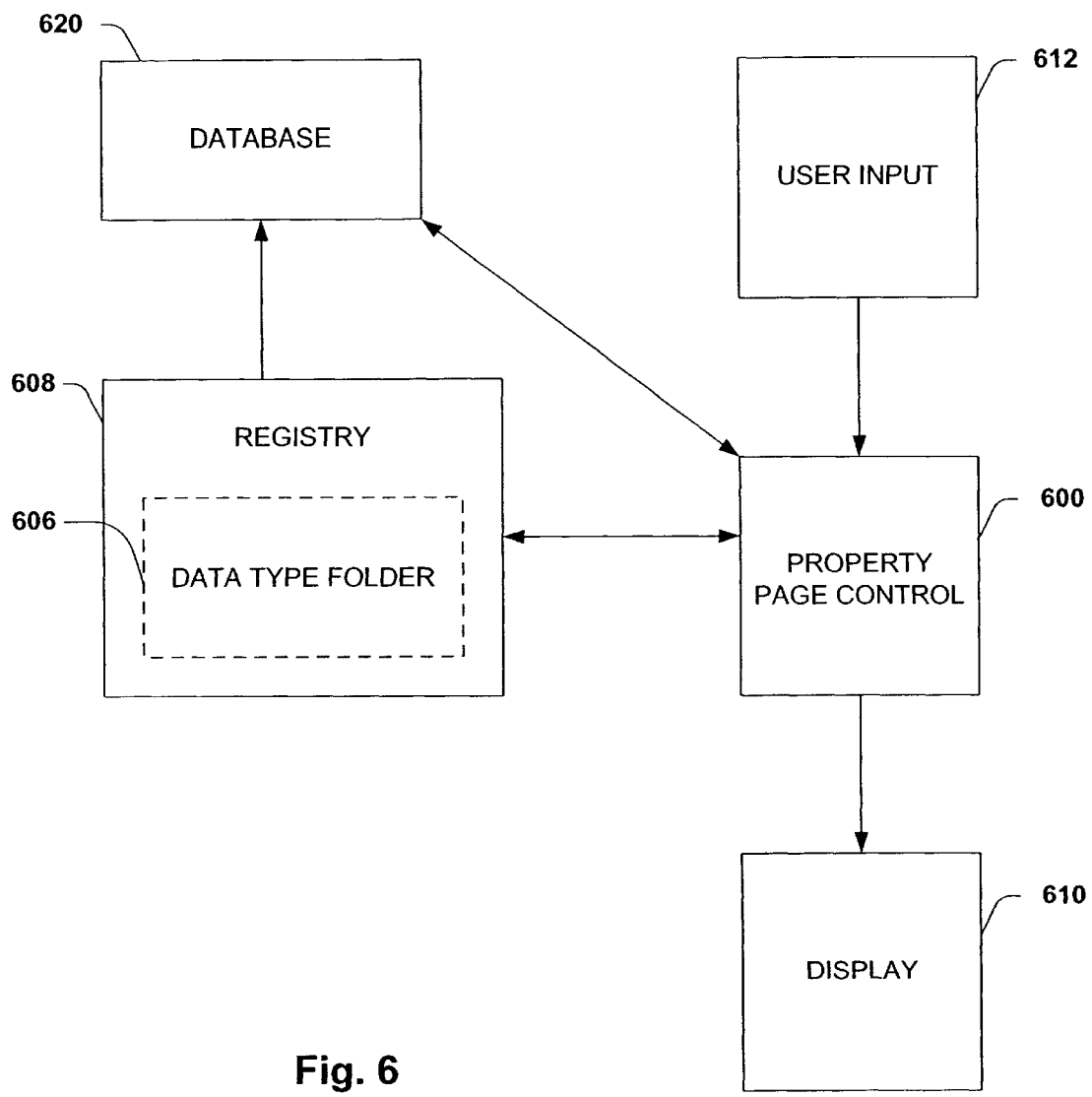
FIG. 6 is a block diagram illustrating a property page control adapted to pull pages from one or more folders in the registry in accordance with another aspect of the present invention.

Turning to FIG. 6, in accordance with another aspect of the present invention, a property page control 600 is adapted to pull and/or receive one or more property pages from one or more data type folder(s) 606 in a registry 608 and to display one or more pages on a display 610 in response to user input 612. User input 612 can constitute different types of input including, but not limited to, mouse clicks, keystrokes, voice commands and/or touch screen inputs. To view one or more property pages associated with a data type, a user can, for example, click a mouse on a view/edit properties command displayed within a window on a computer monitor. The user would typically do this for a particular item for a data type. For instance, the user may opt to view properties for a particular computer program that was put through one type of test, such as a Manual Test. When a user does this, the user input launches the property page control 600 and the control 600 is provided with the type GUID corresponding to the data type that the user is interested in. With this type GUID, the control knows which type folder to query for property pages. The property page control 600 can then, for example, pull one or more appropriate property pages from the data type folder to display to the user. The property page control can be an ActiveX control. An ActiveX control is a self-contained program that can be used within another program to provide additional functionality to the program. An ActiveX control may perform a specific function (e.g., display a property page). Thus, ActiveX controls are similar to plug-ins. As such, the property page control can be a loadable ActiveX control.

With continuing reference to FIG. 6, because some of the pages are selectively enableable property pages while other property pages are regular non-enableable property pages, in response to user input 612, the property page control 600 can determine which pages to display for a particular item for a type of data. Which pages the control 600 determines to display depends, at least in part, upon the kind of property pages in the data type folder 606 and, if selectively enableable property pages are contained within the folder, whether a user has enabled one or more of those selectively enableable property pages. Accordingly, when user input 612 is received by the controller 600 indicating a desire to view property pages for a data type, the control 600 can examine pages within that data type folder 606, and may also access a database 620 that contains information on selectively enableable property pages. Although a database 620 is illustrated, it is to be appreciated by one skilled in the art that other data stores, including, but not limited to, a rational database, a hierarchical database, an OLAP database, an OLAP database, a table, an array, a list, a linked list, a tree, a hash, a stack and a data cube may be employed in accordance with the present invention.

Accordingly, the present invention contemplates that after a selectively enableable property page is added to a type of data (e.g., put in the folder for the data type via a plug-in), a user can selectively enable that property page for particular items for that type of data. In this fashion, once a page has been enabled for particular items for a type of data, in response to user input, that page can be viewed by the user for those particular items for that type of data. The present invention contemplates any suitable manner of enablement. For example, for each particular item of each data type, a user may be able to examine a list of selectively enableable property pages. The list can be generated and displayed to a user in any suitable manner, including, but not limited to, pulling data strings corresponding to titles of property pages from the data type folders for the particular items of interest. The user can, for example, selectively enable any one or more of those property pages by choosing from the list of these pages. The user can choose the pages from the list, for example, by clicking a mouse on respective boxes located next to the titles of the pages. Once a user enables a selectively enableable property page for a particular item for a data type, the page GUID associated with this selectively enableable property page is sent to and stored within the database 620 along with other information as discussed in further detail below.

Figure 7:
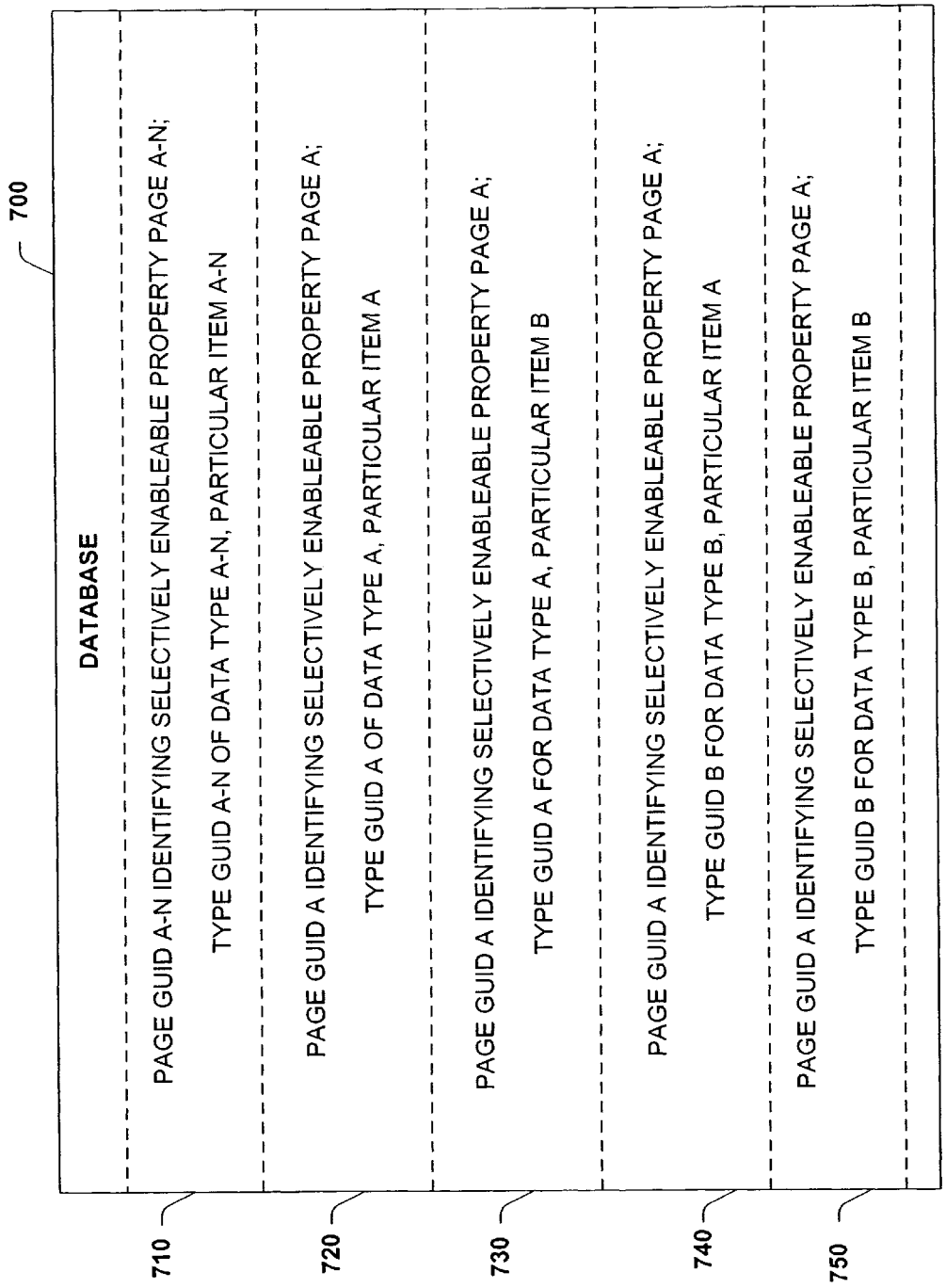
FIG. 7 is an illustration of a database adapted to store information and more particularly GUIDs regarding whether a selectively enableable property page has been enabled and for which particular item(s) and data type(s) it has been enabled.

More particularly, and with reference now to FIG. 7, when a selectively enableable property page is enabled, a page GUID corresponding to that page is stored in a database 700 in Conjunction with a type GUID associated with the data type for which the page has been enabled. This type GUID is also stored in the database 700 in association with the particular item for which that the page has been enabled. It is to be appreciated that since selectively enableable property pages can be added to one or more type folders, and can therefore be selectively enabled for one or more data types, page GUIDs stored in the database 700 can be associated with one or more type GUIDs. Similarly, it is to be further appreciated that since one or more selectively enableable property pages can be selectively enabled for one or more particular items within a data type, the type GUIDs which are stored in the database 700 in association with a page GUID can also be associated with one or more particular items.

A first entry 710 shown in FIG. 7 illustrates the information that can be stored in the database 700 through the use of GUIDs numbering to N where N is an integer. More particularly, entry 710 illustrates that page GUIDs A–N identifying a selectively enableable property page A–N (that have been enabled) are stored in the database 700 in association with the one or more type GUIDs A–N corresponding to the data types for which the page has been enabled. Furthermore, the one or more type GUIDs may be associated with the particular items for which the page has been enabled.

The subsequent entries in FIG. 7 are more particular examples which clarify the information that is stored in the database 700. For instance, a second entry 720 in FIG. 7 includes the page GUID A that identifies the selectively enableable property page A (which has been enabled). This page GUID A is associated with a type GUID, namely type GUID A. This type GUID A identifies one of the types of data, namely data type A, for which page A has been enabled. This type GUID A is also associated with a particular item, namely particular item A. This indicates that page A was enabled for the particular item A within data type A.

A third entry 730 in FIG. 7 also includes a page GUID A that identifies the selectively enableable property page A that has been enabled. This page GUID A is again associated with type GUID A which identifies one of the types of data, namely data type A, for which page A has been enabled. However, the type GUID A is now associated with a different particular item, namely particular item B, signifying that page A has been enabled for particular item B within data type A.

A fourth entry 740 in FIG. 7 also includes a page GUID A that identifies the selectively enableable property page A that has been enabled. However, this page GUID A is now associated with a different type GUID, namely type GUID B, which identifies a different type of data, namely data type B, for which page A has been enabled. This type GUID B is associated with a particular item, namely particular item A. This indicates that page A has been enabled for the particular item A within data type B.

A fifth entry 750 in FIG. 7 includes a page GUID A that identifies the selectively enableable property page A that has been enabled. This page GUID is associated with a type GUID B that indicates that page A has been enabled for data type B. However, type GUID B is associated with particular item B. This indicates that page A has been enabled for particular item B within data type B.

By way of further example, referring back to the computer program example from the background, if a property page is enabled for a particular computer program (item) for a data type (e.g., Manual Test that the program is put through), the page GUID identifying the property page is stored in the database 700 along with the type GUID that identifies the type of data (e.g., Manual Test) for which the page has been enabled. Additionally, the type GUID is also associated with the particular item (e.g. particular computer program) for which the page has been enabled.

Referring now to FIGS. 5, 6 and 7, in response to user input 612 indicating a user's desire to view one or more property pages for a particular item (e.g. computer program) for a data type (e.g. Manual Test), the page control 600 is operative to display those property pages to the user via the display 610. It is to be appreciated that the display 610 can be any type of display (e.g., a computer monitor). It is also to be appreciated that the property pages may contain any type of data in any format or medium. For instance, any one of the property pages, including regular and/or selectively enableable property pages, can contain data including, but not limited to, audio data that can be displayed to a user via speakers. In this instance, the speakers would constitute the display.

In accordance with the user input, the control 600 can be operative to utilize the type GUID corresponding to the data type that the user is interested in to determine which property pages to display. More particularly, the control 600 can utilize this type GUID to locate the appropriate type folder whose contents are to be examined. To determine which property pages within this type folder to display, the control 600 initially loads each of the property pages from the appropriate type folder, as identified by the user input, and asks each of the pages whether they are selectively enableable property pages or regular property pages. To do this, the control 600 queries each of the pages for page GUIDs. Pages that return no GUIDs are presumed to be a regular property pages that are to be displayed for all data types and for all particular items for the data types. Accordingly, these pages are immediately made available for display to the user via the display 610. Pages that do return page GUIDs are presumed to be selectively enableable property pages that are only to be displayed for particular items of data types for which they have been enabled. To determine whether a selectively enableable property page has been enabled for the particular item of interest of this data type, the control looks for a matching page GUID in the database. More particularly, the control looks for the page GUID that identifies this page in the database. If this page GUID is found in the database, then this is evidence that this page has been enabled. To then determine whether this selectively enableable property page has been enabled for the particular item of interest of this data type, the control looks in the database to see if the page GUID is further associated with the type GUID for this data type and, if so, whether the type GUID is, in turn, associated with the particular item of interest. If so, the control 600 determines that the page has been enabled for the particular item of interest of this type of data and this page is therefore made available for display to the user via the display 610.

Figure 8:
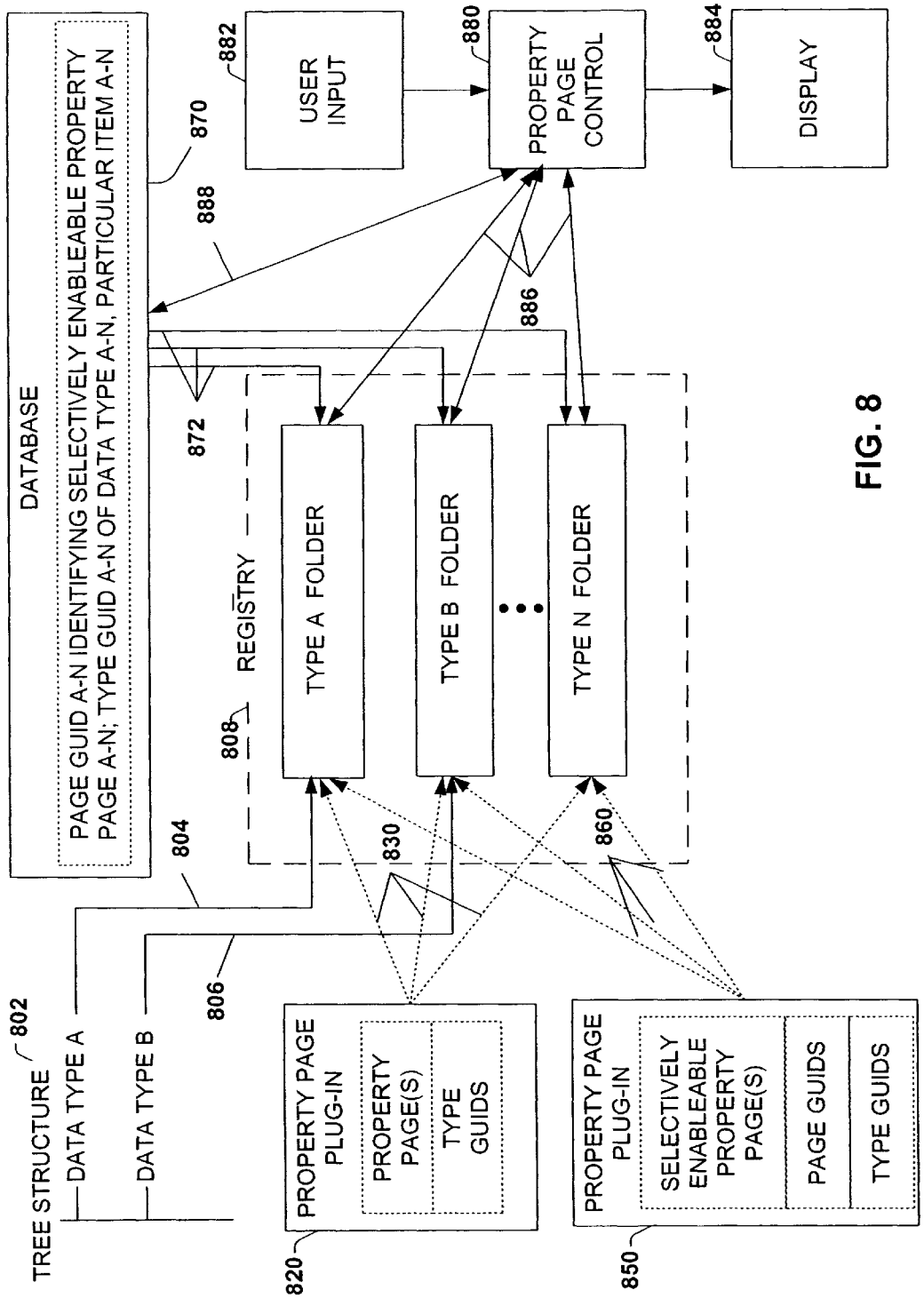
FIG. 8 is an overview of the systems for adding property pages to data types and displaying the property pages in accordance with the present invention.

Turning now to FIG. 8, an overview of the systems described herein is illustrated. A tree structure 802 having multiple data type nodes, namely data type A and data type B nodes, is shown. The data type nodes are shown with arrows 804, 806 pointing to respective data type folders located in the registry 808. The registry is shown as containing a plurality of folders, namely type A folder and type B folder down to a type N folder. N is an integer and this, accordingly, indicates that the registry 808 can contain any suitable number of folders to hold the data for any number of data types. Each type folder has a type GUID (not shown) associated with it. This type GUID identifies the data type corresponding to the data that is contained within each of the respective folders. Each type folder also contains both the regular and selectively enableable property pages (not shown) for the data type. Page GUIDs (not shown) which identify each selectively enableable property page are also contained within each of the folders.

A property page plug-in 820 that can add property pages to data types is also illustrated. The property page plug-in includes the property pages to be added to the data types as well as the type GUIDs of the data types to which the pages are to be added. More particularly, each page has associated with it the select type GUIDs that identify the data types to which the page is to be added. Dotted lines 830 drawn from the plug-in 820 to the type folders indicate that select property pages can be added to select data types.

A second property page plug-in 850 is also illustrated in FIG. 8. This property page plug-in can add selectively enableable property pages to data types. The property page plug-in includes the selectively enableable property pages to be added to the data types as well as the type GUIDs of the data types to which the pages are to be added. More particularly, each page has associated with it the select type GUIDs that identify the data types to which the page is to be added. In this plug-in, a page GUID is also associated with each selectively enableable property page to identify each page. Dotted lines 860 are drawn from the plug-in 850 to the type folders to indicate that any of the select property pages can be added to any of the select data types.

A database 870 is also shown. Lines 872 drawn from each of the data type folders to the database 870 indicate that page GUIDs are sent to and stored within the database when selectively enableable property pages, identified by those page GUIDs, are enabled. The lines 872 also indicate that the page GUIDs are stored in the database in association with the type GUIDs that identify the particular data types for which the pages were enabled as well as the particular item for which the pages were enabled.

The property page control 880 is shown as receiving user input 882 and outputting a signal to a display 884. Bi-directional arrows 886 from the property page control 880 to each of the data type folders indicate that, in response to user input, the page control 880 can examine and pull from select folders select pages to render to the display 884. A bi-directional arrow 888 from the page control 880 to the database 870 indicates that the control 880 can consult or look at the data within the database to determine whether to display a selectively enableable property page.

Figure 9:
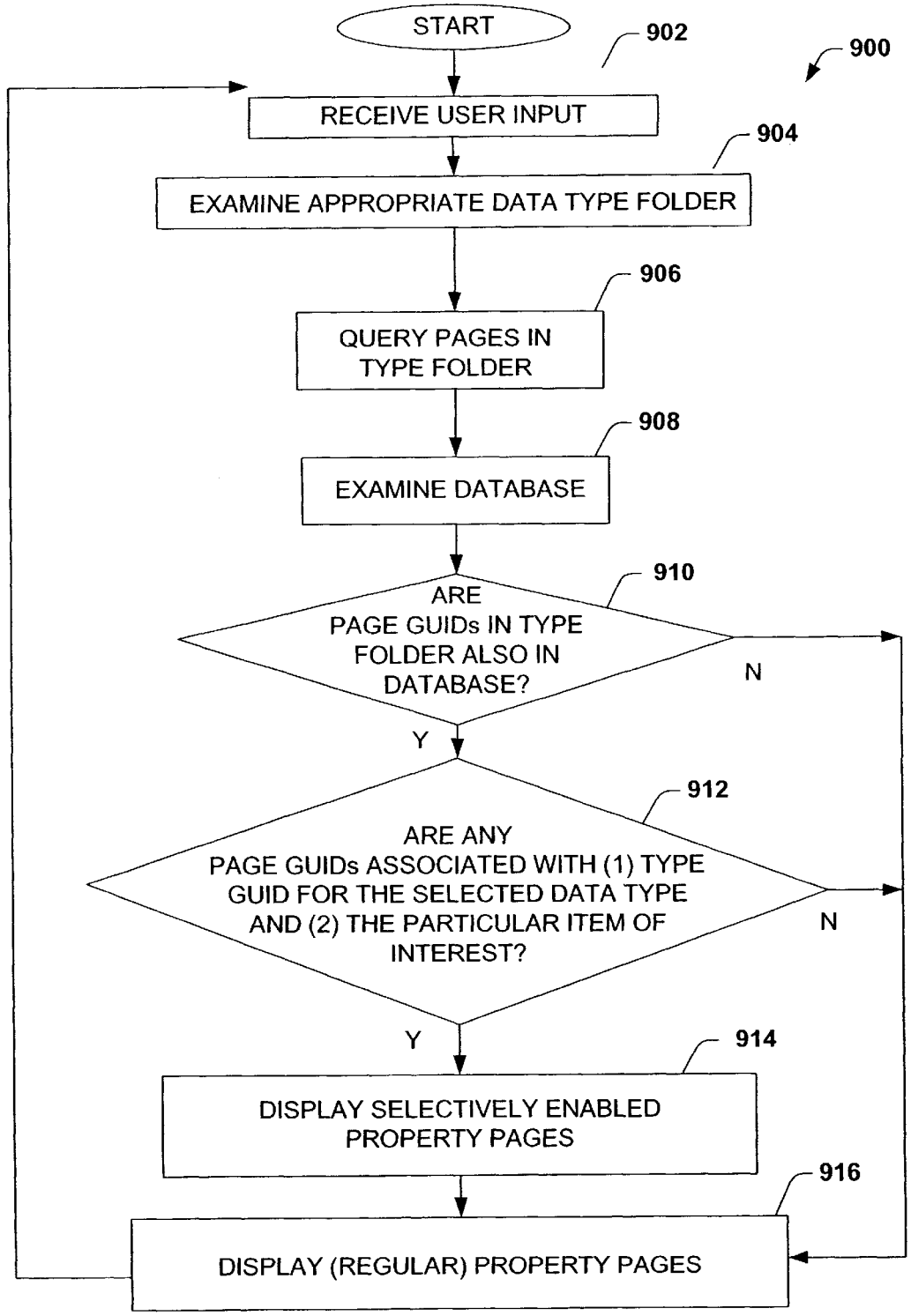
FIG. 9 is a flow diagram illustrating a methodology for displaying a property page on a display in response to user input in accordance with one aspect of the present invention.

In view of the foregoing graphical, structural and functional features described above, a methodology in accordance with various aspects of the present invention will be better appreciated with reference to FIG. 9. While, for purposes of simplicity of explanation, the methodology of FIG. 9 is shown and described as occurring serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

Turning now to FIG. 9, a flow diagram 900 is illustrated for a methodology for displaying a property page to a user. The process begins at 902 wherein user input is received. The process then proceeds to 904 wherein the control looks to the appropriate data type folder in the registry in accordance with user input. The process then proceeds to 906 wherein the control queries the pages within the appropriate type folder. The process then proceeds to 908 wherein the control looks to the database. After 908, the process proceeds to 910 wherein a determination is made whether one or more of the page GUIDs from the type folder are also in the database, thus indicating that selectively enableable property pages have been enabled. If the determination in 910 is affirmative, the process proceeds to 912 wherein a determination is made concerning whether one or more of these page GUIDs are associated with the type GUID of the selected data type in accordance with user input. Also, at 912 a determination is made concerning whether the type GUID is associated with the particular item of interest in accordance with user input. If the determination in 912 is affirmative, the process proceeds to 914 wherein the selec- tively enabled property page is made available for display to a user via the display. After 914 the process proceeds to 916 wherein the regular property pages in the appropriate data type folder are made available for display to a user. If the determination in 910 or 912 is negative the process jumps to 916 wherein regular property pages are displayed. In this instance, there are no selectively enableable property pages, or if one or more selectively enableable property pages exist for this data type, they have either not been enabled or have not been enabled for the particular item of interest. After 916, the process returns to 902 to again receive user input.

It is to be appreciated that the present invention can be used to incorporate data into any number of data types at any level: For instance, the present invention can be adapted to display a property page within every item within any sub group of a data type. More particularly, rather than just enabling a property page for a particular item of a data type, the present invention can be adapted to display a property page within all items within one or more classes of data where the classes of data are a sub grouping of the data type. Accordingly, the present invention can be adapted to display a property page within every item below a certain class or level of data. This can be accomplished in one action by enabling the page within the class, rather than within every particular item within the class. Similarly, the present invention can be adapted to display a page within every item of one data type. This can similarly be accomplished in a single action by enabling the page within the data type, rather than within every particular item within the data type.

It is to be further appreciated that any one of the components described herein, such as the property page plug-ins, the type folders in the registry and/or the property page control, can be implemented utilizing Component Object Model (COM) based interface systems and/or methodologies. Such systems and/or methodologies are known in the art and their application with respect to the present invention can, accordingly, be appreciated by those skilled in the art.

Figure 10:
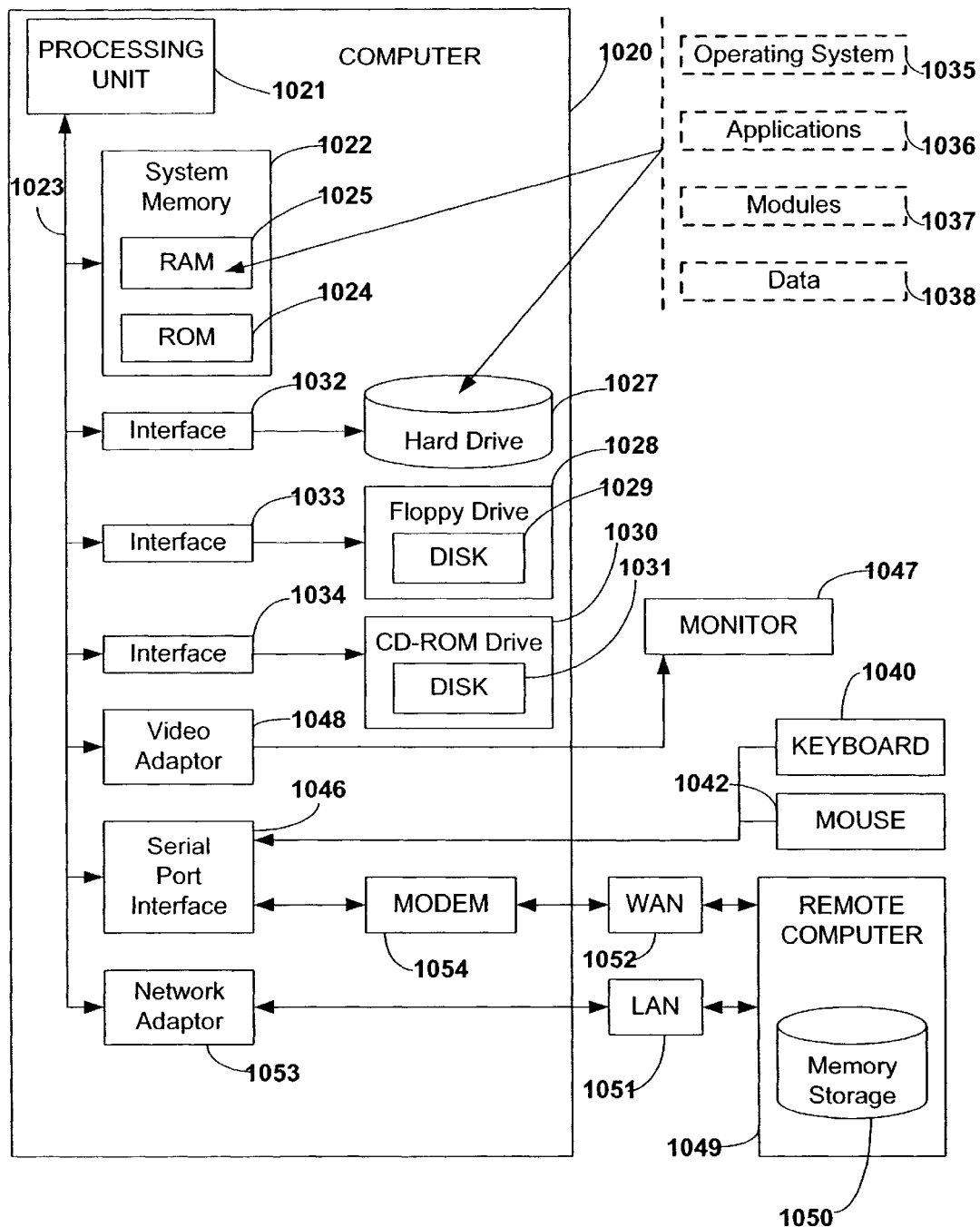
FIG. 10. is a block diagram illustrating a suitable operating environment in accordance with the present invention.

With reference to FIG. 10, an exemplary system for implementing the invention includes a conventional personal or server computer 1020, including a processing unit 1021, a system memory 1022, and a system bus 1023 that couples various system components including the system memory to the processing unit 1021. The processing unit may be any of various commercially available processors. Dual microprocessors and other multi-processor architectures also can be used as the processing unit 1021.

The system bus may be any of several types of bus structure including a memory bus or memory controller, a peripheral bus, and a local bus using any of a variety of commercially available bus architectures. The system memory includes read only memory (ROM) 1024 and random access memory (RAM) 1025. A basic input/output system (BIOS), containing the basic routines that help to transfer information between elements within the computer 1020, such as during start-up, is stored in ROM 1024.

The computer 1020 further includes a hard disk drive 1027, a magnetic disk drive 1028, e.g. to read from or write to a removable disk 1029, and an optical disk drive 1030, e.g. for reading a CD-ROM disk 1031 or to read from or write to other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of data, data structures, computer-executable instructions, etc. for the server computer 1020. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment. A number of program modules may be stored in the drives and RAM 1025, including an operating system 1035, one or more application programs 1036, other program modules 1037, and program data 1038.

A user may enter commands and information into the computer 1020 through a keyboard 1040 and pointing device, such as a mouse 1042. Other input devices (not shown) may include a microphone, joystick, game pad, satellite dish, scanner, or the like. These and other input devices are often connected to the processing unit 1021 through a serial port interface 1046 that is coupled to the system bus, but may be connected by other interfaces, such as a parallel port, game port or a universal serial bus (USB). A monitor 1047 or other type of display device is also connected to the system bus 1023 via an interface, such as a video adapter 1048. In addition to the monitor, computers typically include other peripheral output devices (not shown), such as speakers and printers.

The computer 1020 may operate in a networked environment using logical connections to one or more remote computers, such as a remote server or client computer 1049. The remote computer 1049 may be a workstation, a server computer, a router, a peer device or other common network node, and typically includes many or all of the elements described relative to the computer 1020, although only a memory storage device 1050 has been illustrated in FIG. 10. The logical connections depicted in FIG. 10 include a local area network (LAN) 1051 and a wide area network (WAN) 1052. Such networking environments are commonplace in offices, enterprise-wide computer networks, intranets and the Internet.

When used in a LAN networking environment, the computer 1020 is connected to the local network 1051 through a network interface or adapter 1053. When used in a WAN networking environment, the server computer 1020 typically includes a modem 1054, or is connected to a communications server on the LAN, or has other means for establishing communications over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communications link between the computers may be used.

In accordance with practices of persons skilled in the art of computer programming, the present invention has been described with reference to acts and symbolic representations of operations that are performed by the computer 1020, unless indicated otherwise. Such acts and operations are sometimes referred to as being computer-executed. It will be appreciated that the acts and symbolically represented operations include the manipulation by the processing unit 1021 of electrical signals representing data bits which causes a resulting transformation or reduction of the electrical signal representation, and the maintenance of data bits at memory locations in the memory system (including the system memory 1022, hard drive 1027, floppy disks 1029, and CD-ROM 1031) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and several particular examples, however, it is to be appreciated that various programming methodologies and/or computer architectures suitable for carrying out the present invention may be employed and are intended to fall within the scope of the hereto appended claims.

What has been described above are preferred aspects of the present invention. It is, of course, not possible to describe every conceivable combination of aspects, components and/or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that associates at least one property page with at least one type of data comprising:
   a property page plug-in that includes the at least one property page;
   if the property page does not have a unique identifier, the plug-in associates the property page with a plurality of data types; and
   if the property image has a unique identifier, the plug-in associates the at least one property page with the at least one type of data based upon the unique identifier that identifies the type of data to which the at least one property page is to be associated.

2. A system to present data comprising:
   a folder that contains N number of property pages for a type of data, N being an integer;
   a globally unique identifier (GUID) associated with at least one of the type of data;
   a property page control operatively coupled to the folder and adapted to collect at least one of the property pages from the folder based upon user input; and
   a control reveal the collected property page for all types of data if the GUID does not associate the collected property page with at least one of the type of data.

3. The system of claim 2 wherein the control is also adapted to present the at least one collected property page to a user via display.

4. The system of claim 2 further comprising:
   a property page plug-in that includes at least one new property page that is to be included in the folder, the plug-in being adapted to include the at least one property page in the folder based upon the GUID.

5. The system of claim 2 further comprising:
   at least one additional folder adapted to contain at least one additional property page for an additional type of data; and
   at least one additional GUID associated with the at least one additional type of data,
   the property page control operatively coupled to the at least one additional folder and adapted to collect the at least one additional property page from the at least one additional folder in response to user input and based upon the at least one additional GUID.

6. The system of claim 5 further comprising:

a property page plug-in that includes at least one new property page, the plug-in adapted to include the at least one new property page in the folder based upon the GUID and in the at least one additional folder based upon the at least one additional GUID.

7. The system of claim 6 further comprising:

a property page plug-in that includes at least one selectively enableable property page that is to be included in the folder, the plug-in being operatively coupleable to the folder and adapted to include the at least one selectively enableable property page in the folder based upon the type GUID corresponding to the type of data.

8. A control adapted to present a property page comprising:

a first component adapted to determine if the property page has an associated identifier;

a second component adapted to present the property page for all types of data if the property page does not have a unique identifier;

a third component adapted to determine if the property page has been enabled for a particular item of a data type if the property page does have a unique identifier;

a fourth component adapted to display the property page only for the particular item of the data type if the property page a has been enabled to be displayed within a particular item of a data type.

9. A method for displaying a property page comprising:

determining if the page has an associated page GUID;

displaying the page for all types of data if the page does not have an associated GUID;

determining if the page has been enabled for a particular item of a type of data if the page does have an associated GUID; and displaying the page for that particular item for the type of data if the page has been enabled for a particular item of a type of data.

10. A computer readable medium having computer-executable instructions adapted to perform the steps recited in claim 9.

11. In a computer system having a graphical user interface, a method for presenting a property page comprising:

determining if the property page has an associated identifier;

displaying the property page for all types of data if the property page does not have an associated identifier;

determining if the property page has been enabled for a particular item of a type of data if the property page does have an associated identifier; and displaying the property page for that particular item for the type of data if the property page has been enabled for a particular item of a type of data.

12. A computer readable medium having computer-executable instructions adapted to perform the steps recited in claim 11.

* * * * *

UNITED STATES PATENT AND TRADEMARK OFFICE
CERTIFICATE OF CORRECTION

PATENT NO. : 6,784,883 B1
DATED : August 31, 2004
INVENTOR(S) : Jason Allor

It is certified that error appears in the above-identified patent and that said Letters Patent is hereby corrected as shown below:

Column 2,
Line 66, after "types of" insert -- data --.

Column 10,
Line 16, delete "OLAP" and insert -- OLTP --.

Column 16,
Line 32, delete "image" and insert -- page --.
Line 45, after "control" insert -- to --.

Signed and Sealed this

Third Day of May, 2005

JON W. DUDAS
*Director of the United States Patent and Trademark Office*